(12) United States Patent
Lin

(10) Patent No.: US 8,729,424 B2
(45) Date of Patent: May 20, 2014

(54) HYBRID WELDING WITH MULTIPLE HEAT SOURCES

(75) Inventor: Dechao Lin, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 725 days.

(21) Appl. No.: 12/708,249

(22) Filed: Feb. 18, 2010

(65) Prior Publication Data

US 2011/0198317 A1    Aug. 18, 2011

(51) Int. Cl.
*B23K 26/00*    (2006.01)

(52) U.S. Cl.
USPC .............. 219/121.64; 219/121.6; 219/121.63

(58) Field of Classification Search
USPC ............ 219/73, 136, 121.46, 121.64, 121.14, 219/121.63, 121.6
See application file for complete search history.

(56) References Cited

U.S. PATENT DOCUMENTS

| | | | |
|---|---|---|---|
| 4,167,662 A | 9/1979 | Steen | |
| 4,223,202 A | 9/1980 | Peters et al. | |
| 4,390,774 A | 6/1983 | Steen et al. | |
| 4,542,846 A * | 9/1985 | Matsui et al. | 228/114.5 |
| 4,689,467 A | 8/1987 | Inoue | |
| 4,751,365 A | 6/1988 | La Rocca et al. | |
| 4,912,297 A * | 3/1990 | Beyer et al. | 219/121.63 |
| 5,187,345 A | 2/1993 | Alling et al. | |
| 5,227,609 A * | 7/1993 | Simon et al. | 219/137 R |
| 5,990,446 A * | 11/1999 | Zhang et al. | 219/137 PS |
| 6,469,277 B1 | 10/2002 | Trube et al. | |
| 6,815,634 B2 | 11/2004 | Sonoda et al. | |
| 7,009,136 B2 | 3/2006 | Schlag | |
| 7,154,064 B2 | 12/2006 | Wang et al. | |
| 2006/0065643 A1 | 3/2006 | Hackius et al. | |
| 2006/0278618 A1 * | 12/2006 | Forrest et al. | 219/121.64 |
| 2007/0228022 A1 | 10/2007 | Muller | |

FOREIGN PATENT DOCUMENTS

| | | | |
|---|---|---|---|
| CN | 101474727 | 7/2009 | |
| CN | 101 590 572 A | 12/2009 | |
| CN | 201 380 364 Y | 1/2010 | |
| DE | 19608074 A1 * | 9/1997 | B23K 28/02 |
| EP | 1193023 | 4/2002 | |
| GB | 1600796 | 10/1981 | |
| JP | 61232079 A | 10/1986 | |

(Continued)

OTHER PUBLICATIONS

International Search Report and Written Opinion for Application No. PCT/US2011/024285 dated May 30, 2011.

*Primary Examiner* — Henry Yuen
*Assistant Examiner* — Ayub Maye
(74) *Attorney, Agent, or Firm* — Kacvinsky Daisak Bluni, PLLC

(57) ABSTRACT

A method of welding a joint includes directing a first output from a high energy density heat source, such as a laser, against a first side of the joint. The method further includes directing a second output from an arc welding heat source, such as a gas metal arc welding torch, against a second side of the joint. The first output produces a keyhole surrounded by a molten metal pool which extends from the first side of the joint toward the second side of the joint. In some embodiments a third output from a second arc welding heat source may also be directed at the first side of the joint. A second molten metal pool produced by the arc welding heat source joins with the first molten metal pool and the third molten metal pool to form a common molten metal pool which solidifies to form the weld.

18 Claims, 13 Drawing Sheets

(56) References Cited

FOREIGN PATENT DOCUMENTS

| JP | H2-117782 A | 5/1990 |
| JP | 06114587 A | 4/1994 |
| JP | 2001334377 | 12/2001 |
| JP | 2003164983 | 6/2003 |

\* cited by examiner

HYBRID WELDING WITH MULTIPLE HEAT SOURCES

BACKGROUND OF THE INVENTION

1. Field of the Invention

The present application relates to methods and apparatuses for welding together a plurality of pieces of metal at a joint between the pieces of metal.

2. Description of Related Art

Recently commercialized hybrid laser arc welding is a method of welding two pieces of metal together which typically combines laser beam welding with gas metal arc welding, for example, on the same side of a joint between the pieces of metal to simultaneously direct both a laser beam and an electric arc at one welding zone to produce a common molten metal pool which solidifies to form a weld. As illustrated in FIG. 1a, a prior art apparatus may accomplish this by directing the laser beam output 10' from a laser 10 (which may comprise a laser resonator and associated optics) and the electric arc output 12' from a gas metal arc welder 12 at the first side 14a of a joint 14 in order to weld a first piece of metal 16a to a second piece of metal 16b to form the joint. Hybrid laser arc welding may increase both the welding speed and the weld penetration depth as compared to conventional arc welding techniques. However, as illustrated in FIG. 1b, the resulting weld 18 may be enhanced much more so on the first side 14a of the joint 14, which is the side that the laser beam output 10' and the electric arc output 12' act on, as opposed to an opposite second side 14b of the joint. In particular, the weld 18 may not extend completely through the joint 14 from the first side 14a to the second side 14b. Further, when the weld 18 does reach the second side 14b of the joint 14, a second portion of the weld 18b may be significantly less thick than a first portion 18a of the weld on the first side 14a of the joint.

One attempt to make a more symmetric weld on both sides of the joint has been to operate the hybrid laser welder described above on the first side 14a of the joint 14, followed by either moving the hybrid laser welder to the second side 14b of the joint or turning over the pieces of metals 16a, b to direct the laser beam output 10' and the electric arc output 12' against the second side of the joint. As illustrated in FIG. 1c, operating the hybrid laser welder first on the first side 14a of the joint 14 and then the second side 14b of the joint may produce a weld 18' which has been enhanced on both sides of the joint. This weld 18' may be more desirable due to it extending more fully and completely from the first side 14a to the second side 14b of the joint 14, which may provide both strength and cosmetic benefits. However, the additional time required to move the hybrid laser welder or rotate the pieces of metal and make two sequential passes with the welding equipment is undesirable.

An alternate method which has been developed is to provide a hybrid laser welder on each side of the joint. This embodiment avoids the disadvantage of requiring movement of the metal pieces or the hybrid laser equipment from one side to the other. In addition, welding-induced distortion or deformation in this case may be less than the 2-pass sequential welding process mentioned above. However, this solution uses a second laser. Since the lasers used to complete the laser hybrid welding operation may be very expensive, it may be undesirable to operate two separate hybrid laser welders on the joint.

Accordingly, a need exists in the art for an improved welding apparatus and corresponding method of welding.

BRIEF SUMMARY OF THE INVENTION

The present disclosure in one aspect describes a method of welding together a plurality of pieces of metal at a joint between the pieces of metal, which may comprise an angle joint. The method comprises directing a first output from a high energy density heat source against a first side of the joint to produce a keyhole surrounded by a first molten metal pool which extends from the first side generally toward a second side of the joint, and simultaneously directing a second output from an arc welding heat source against the second side of the joint to produce a second molten metal pool adjacent the second side of the joint. The first output is directed such that the keyhole extends to the second molten metal pool, whereby the second molten metal pool is joined with the first molten metal pool by the keyhole to create a common molten metal pool which solidifies to form a weld extending through the joint from the first side to the second side.

In some embodiments the high energy density heat source may comprise a laser, an electron beam gun, or a plasma arc welding torch. The arc welding heat source may in some embodiments comprise a gas tungsten arc welding torch, a gas metal arc welding torch, a flux-cored arc welding torch, a submerged arc welding torch, or a plasma arc welding torch. In some embodiments at least one of the first output and the second output from the high energy density heat source and the arc welding heat source, respectively, may be discontinuous. The method may further comprise directing the first output and the second output such that the first output and the second output form a non-zero angle of incidence with respect to one another.

In additional embodiments the method further comprises directing a third output, which may be discontinuous, from a second arc welding heat source against the first side of the joint. The third output from the second arc welding heat source creates a third molten metal pool, which may join with at least the first molten metal pool to form a portion of the common molten metal pool on the first side of the joint. Further, the first output from the high energy density heat source may lag behind or lead the third output from the second arc welding heat source.

Further, in some embodiments a first joint surface on a first one of the pieces of metal and a second joint surface on a second one of the pieces of metal define an angle with respect to one another such that there is a gap therebetween. The angle may be defined by a chamfer on one of the pieces of metal. Additionally, the first output may be directed through the gap to encourage greater penetration through the joint. Also, the common molten metal pool may at least partially fill the gap.

The present disclosure in another aspect describes a welding apparatus configured to weld together a plurality of pieces of metal at a joint between the pieces of metal. The apparatus comprises a high energy density heat source configured to direct a first output against a first side of the joint to produce a keyhole surrounded by a first molten metal pool which extends from the first side generally toward a second side of the joint. The apparatus further comprises an arc welding heat source configured to simultaneously direct a second output against the second side of the joint to produce a second molten metal pool adjacent the second side. The first output is directed such that the keyhole extends to the second molten metal pool, whereby the second molten metal pool is joined with the first molten metal pool by the keyhole to create a common molten metal pool which solidifies to form a weld extending through the joint from the first side to the second side.

The present disclosure in a further aspect describes a method of welding an angle joint between a first piece of metal and a second piece of metal, wherein the first piece of metal has a generally horizontal upper surface and the second piece of metal has a generally horizontal lower surface, wherein at least part of the generally horizontal lower surface of the second piece of metal abuts the upper surface of the first piece of metal to form the angle joint. The method comprises directing a first output from a high energy density heat source against a first side of the angle joint to produce a keyhole surrounded by a first molten metal pool which extends from the first side generally toward a second side of the angle joint, and simultaneously directing a second output from an arc welding heat source against the second side of the angle joint to produce a second molten metal pool adjacent the second side. The first output is directed such that the keyhole extends to the second molten metal pool, whereby the second molten metal pool is joined with the first molten metal pool by the keyhole to create a common molten metal pool which solidifies to form a weld extending through the angle joint from the first side to the second side.

BRIEF DESCRIPTION OF THE SEVERAL VIEWS OF THE DRAWING(S)

Having thus described the embodiments in general terms, reference will now be made to the accompanying drawings, which are not necessarily drawn to scale, and wherein:

FIG. 2c illustrates a welded joint which may result from operating the welding apparatus from FIG. 2b on the joint of FIG. 2a;

Figure 1A:
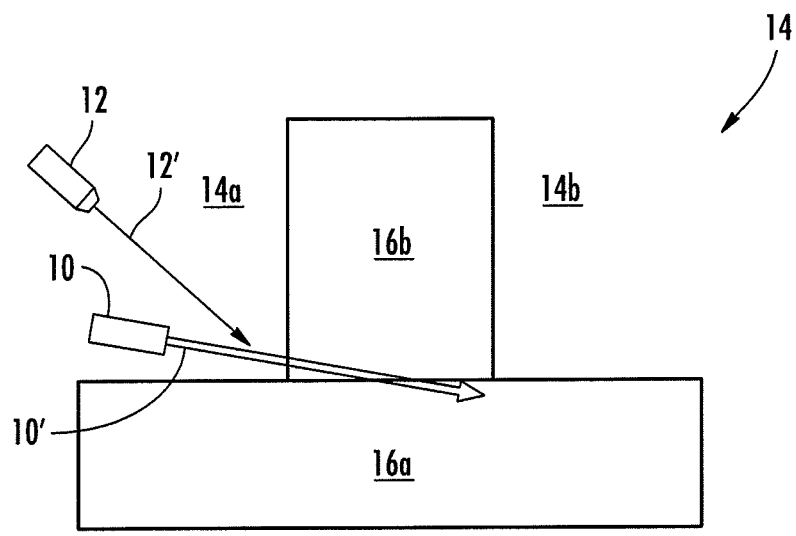
FIG. 1a illustrates a prior art hybrid welding apparatus with a laser and a gas metal arc welder operating on a first side of a joint.
Figure 1B:
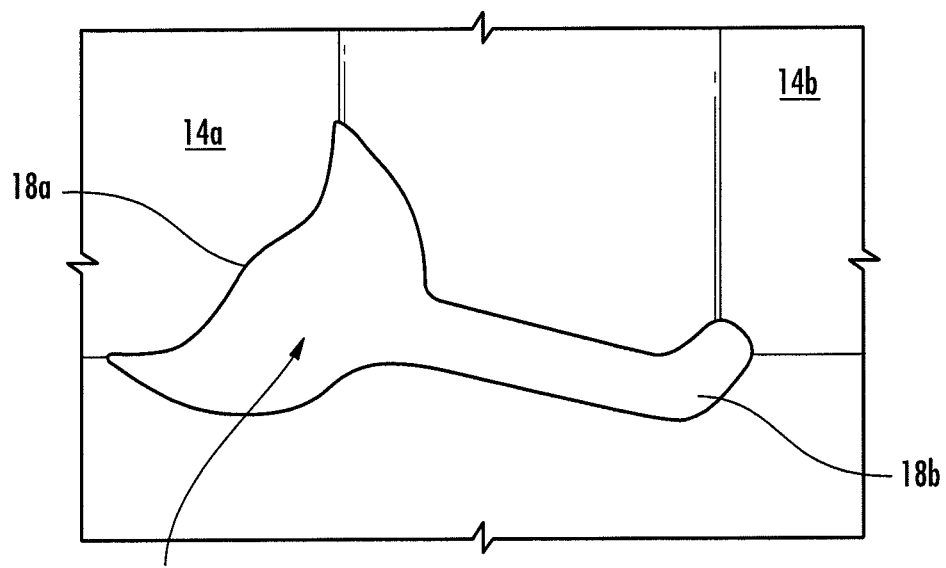
FIG. 1b illustrates a welded joint which may result from operating the prior art hybrid welding apparatus illustrated in FIG. 1a on the first side of the joint.
Figure 1C:
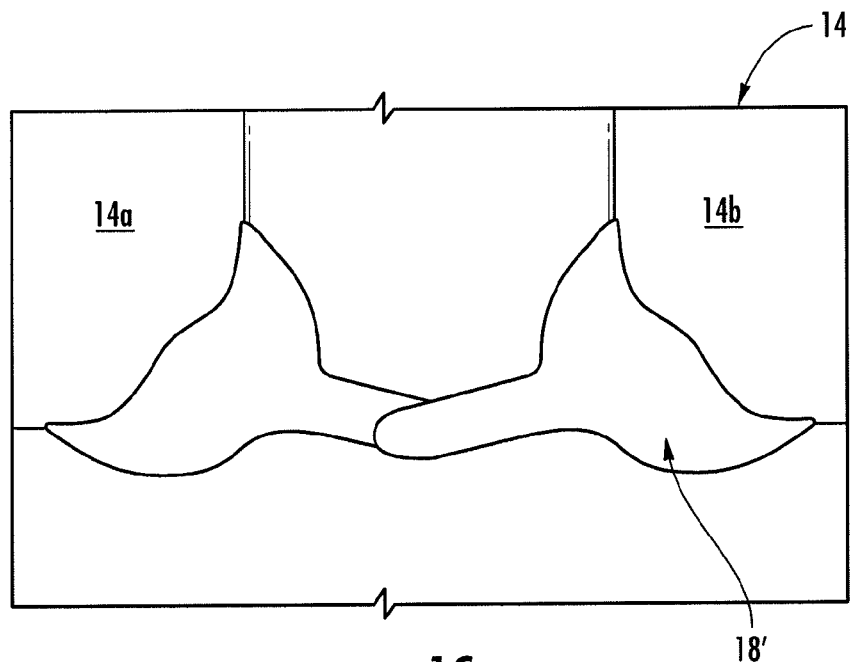
FIG. 1c illustrates a welded joint which may result from operating the prior art hybrid welding apparatus from FIG. 1a on both sides of the joint.
Figure 2A:
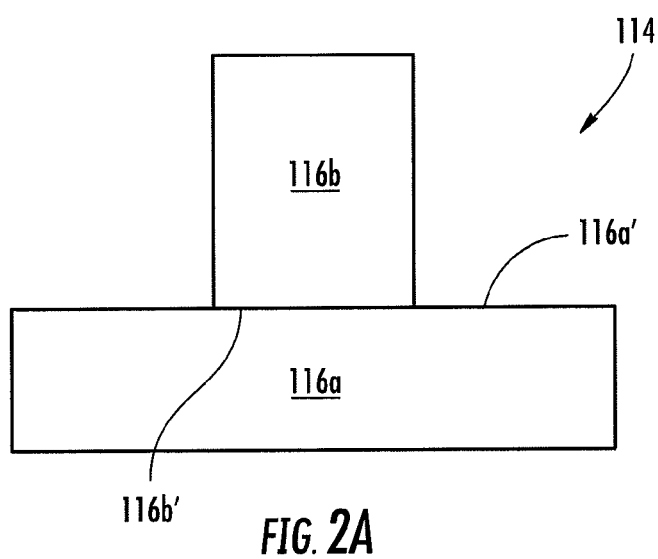
FIG. 2a illustrates a tee-joint comprising a first piece of metal and a second piece of metal.
Figure 2B:
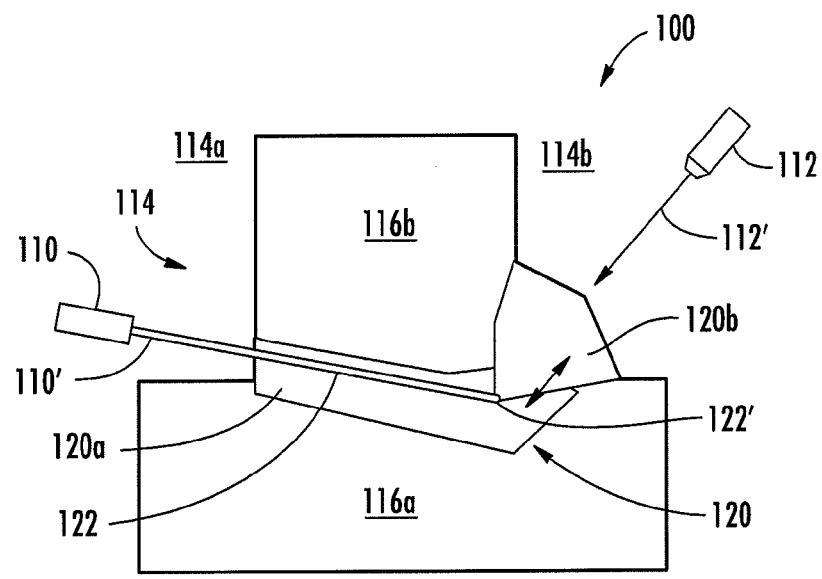
FIG. 2b illustrates a schematic representation of a welding apparatus configured to weld the joint of FIG. 2a comprising a high energy density heat source on a first side of the joint and an arc welding heat source on a second side of the joint.
Figure 9A:
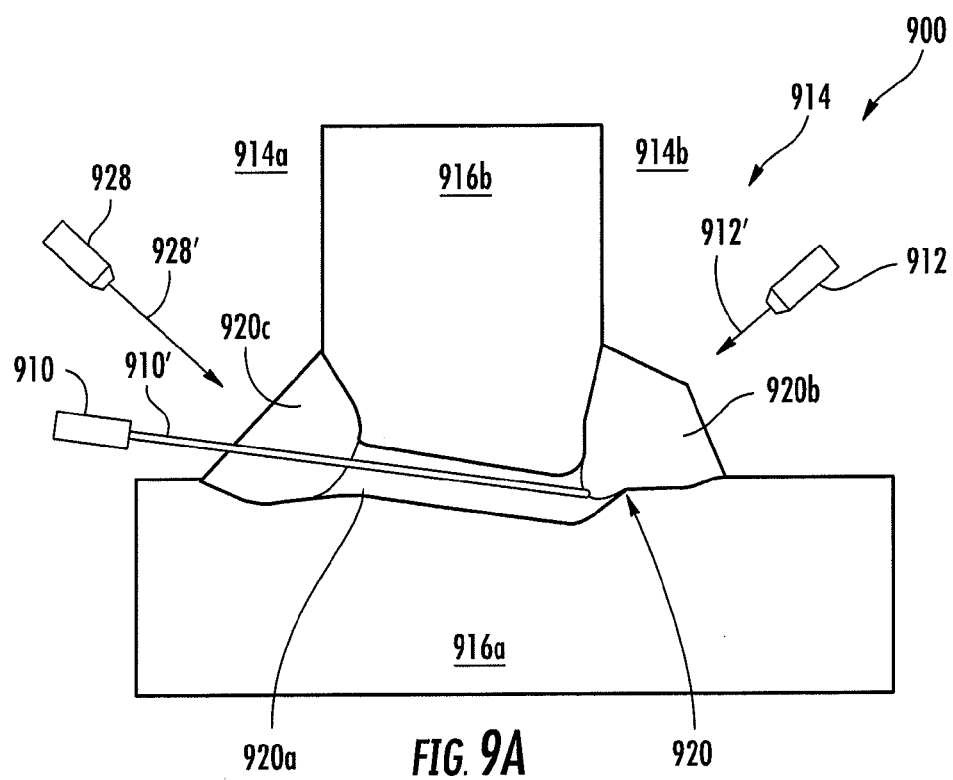
FIG. 9a illustrates a schematic representation of a welding apparatus configured to weld a joint comprising a high energy density heat source on a first side of the joint and an arc welding heat source on a second side of the joint and further a second arc welding heat source on the first side of the joint.
Figure 10A:
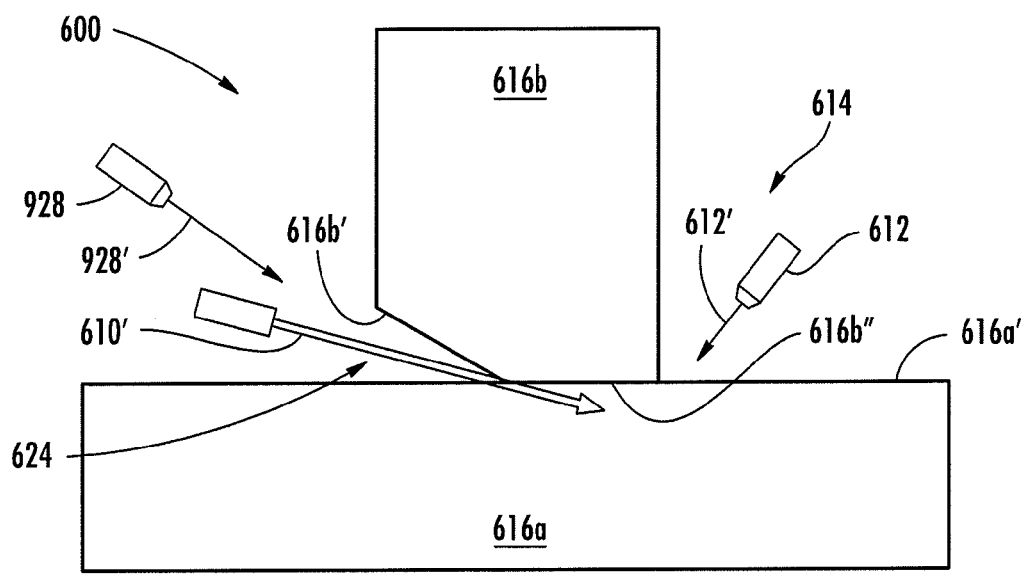
Figure 10B:
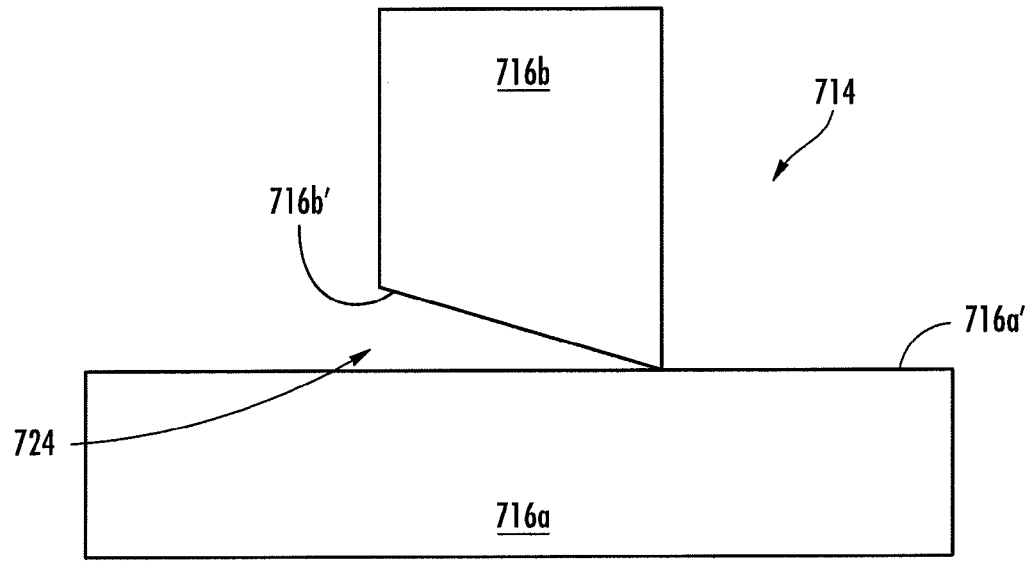
Figure 10C:
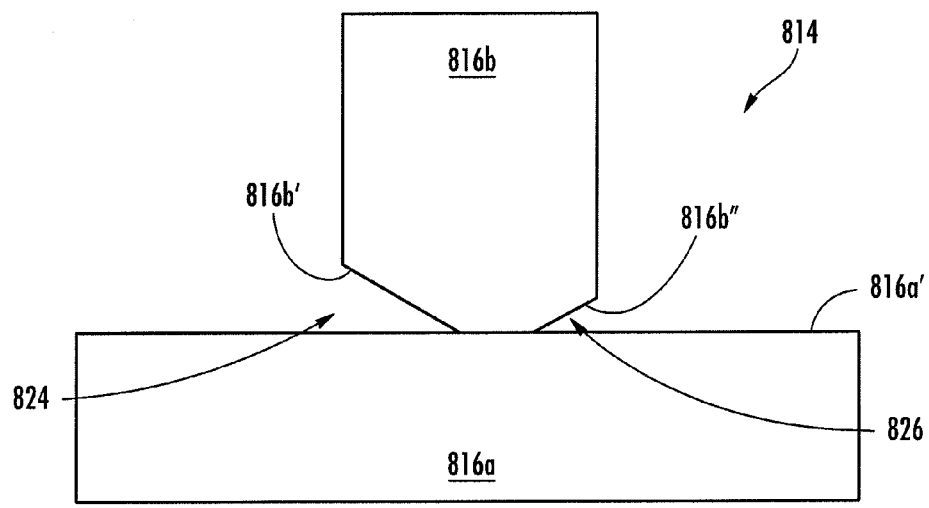
Figure 11A:
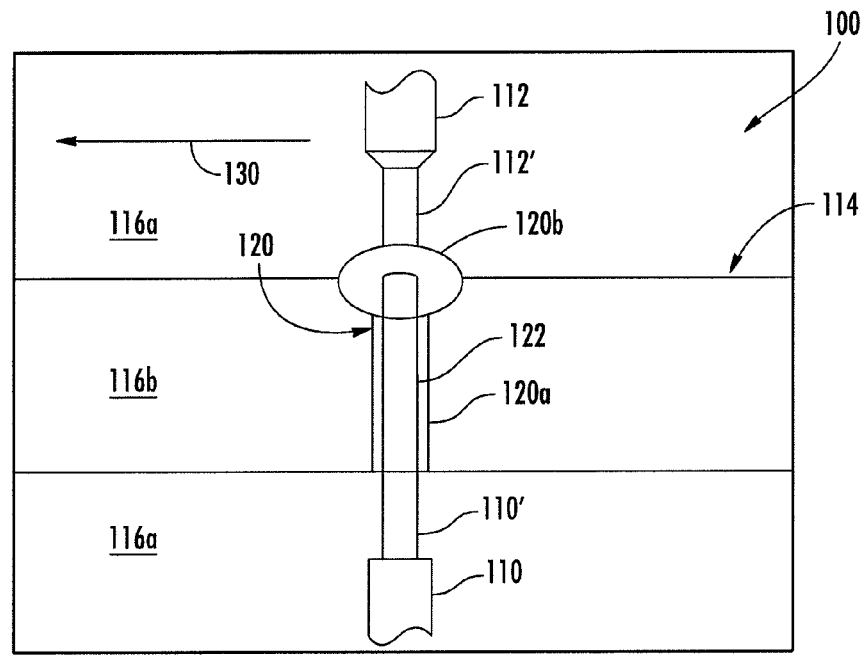
Figure 11B:
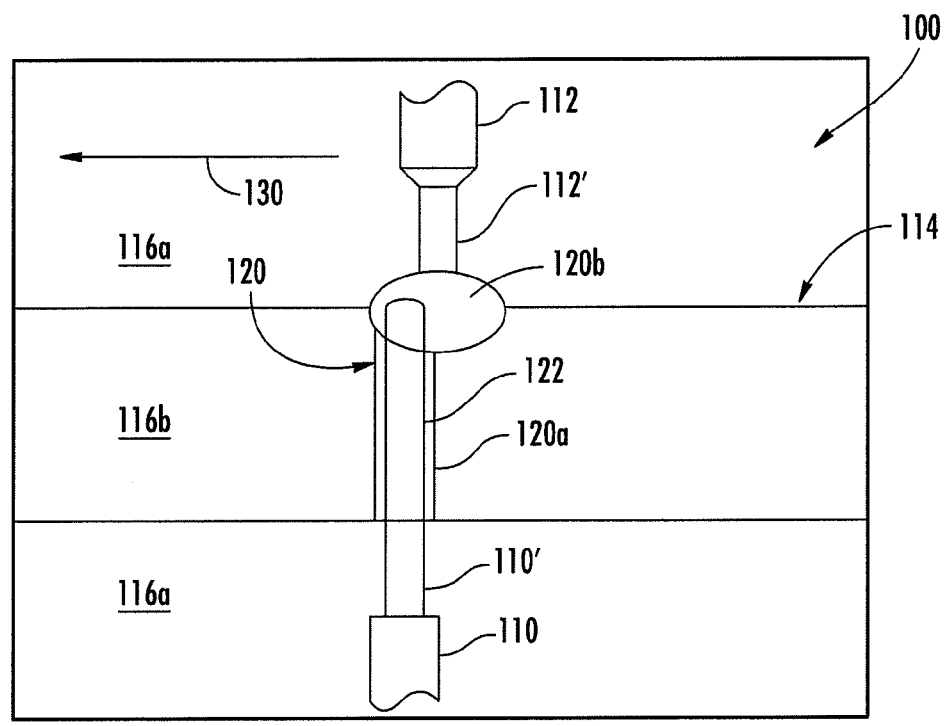
Figure 11C:
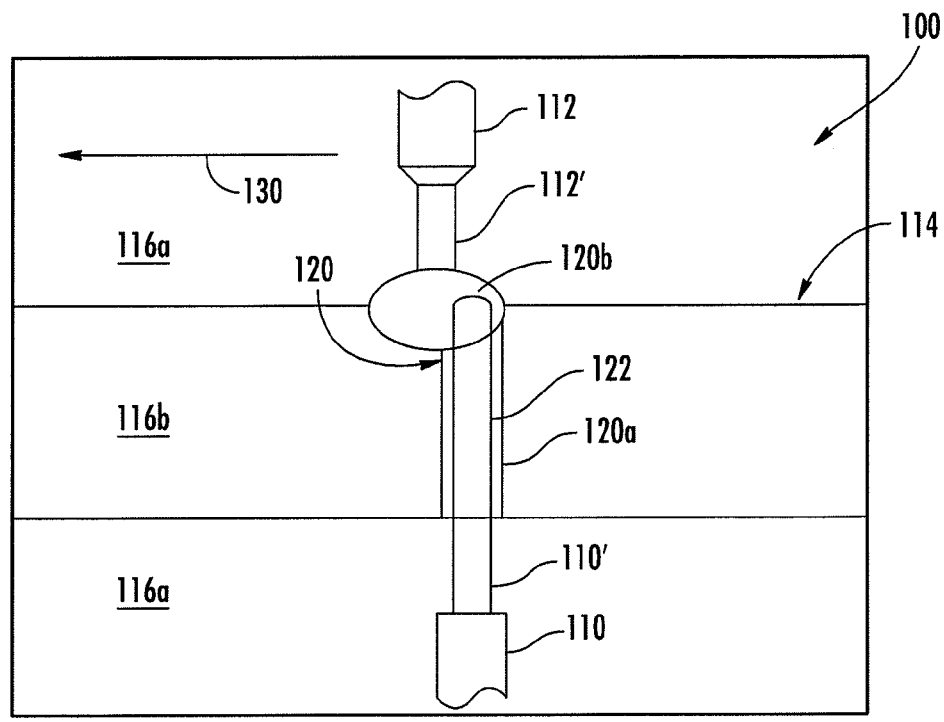
Figure 12:
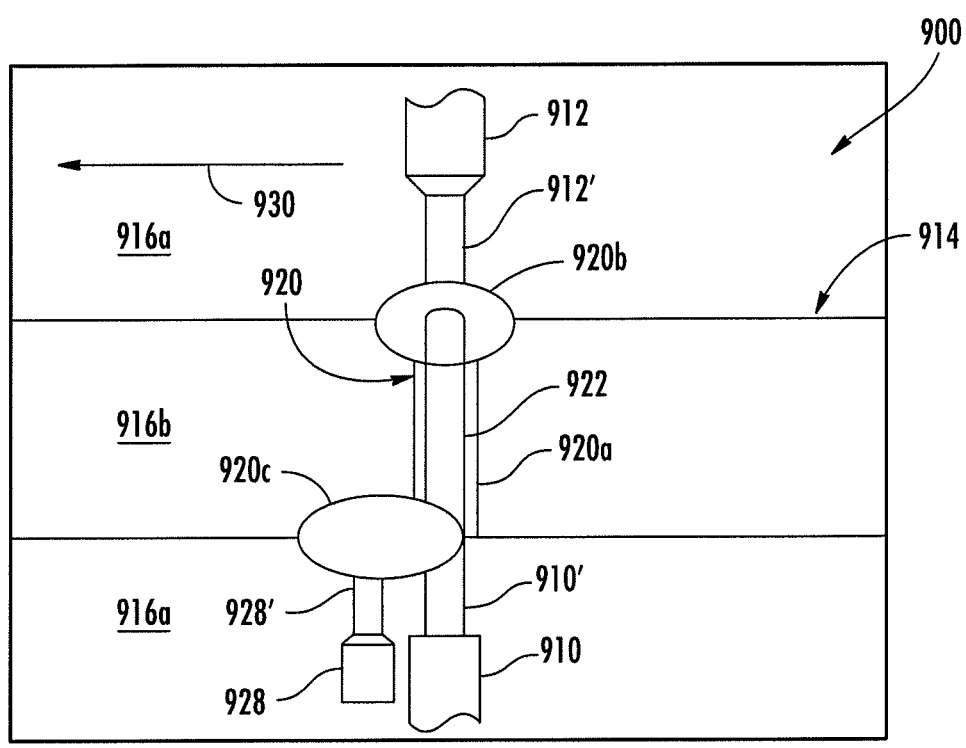
Figure 13:
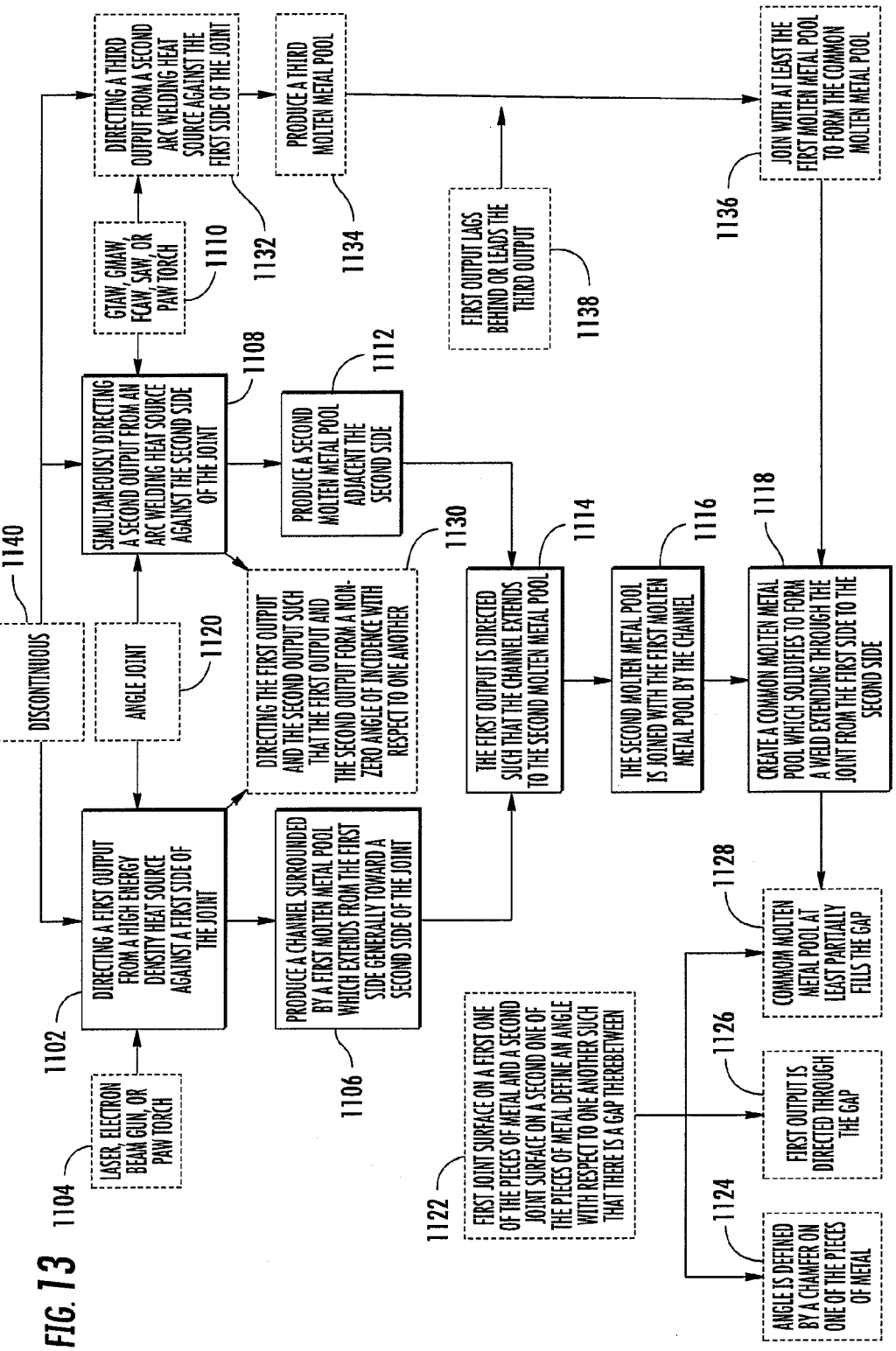
Figure 14:
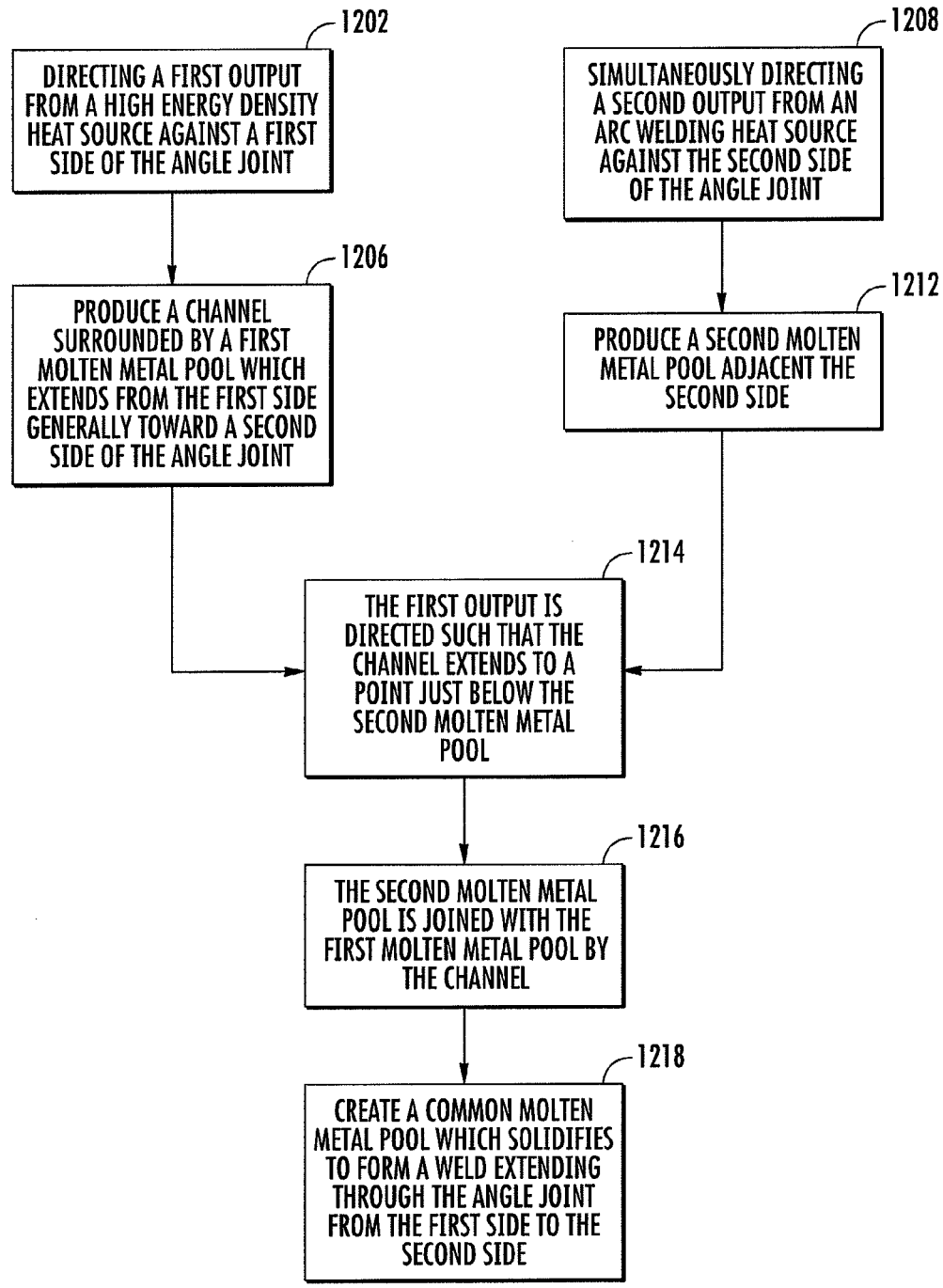

FIG. 10a illustrates the apparatus of FIG. 9a wherein the apparatus is configured to operate on a joint with a first piece of metal that comprises a first joint surface and a second piece of metal that comprises a second joint surface and a third joint surface wherein the first joint surface and the second joint surface define an angle with respect to one another such that there is a gap therebetween, and wherein the third joint surface is generally parallel with the first joint surface;

FIG. 10b illustrates a joint with a first piece of metal that comprises a first joint surface and a second piece of metal that comprises a second joint surface wherein the first joint surface and the second joint surface define an angle with respect to one another;

FIG. 10c illustrates a joint with a first piece of metal that comprises a first joint surface and a second piece of metal that comprises a second joint surface and a third joint surface wherein the first joint surface and the second joint surface define an angle with respect to one another such that there is a gap therebetween, and wherein the first joint surface and the third joint surface define an angle with respect to one another such that there is a second gap therebetween;

FIG. 11a illustrates a top view of the welding apparatus of FIG. 2b wherein a first output and a second output are generally directed at the same section of the joint at the same time;

FIG. 11b illustrates a top view of the welding apparatus of FIG. 2b wherein the first output leads the second output;

FIG. 11c illustrates a top view of the welding apparatus of FIG. 2b wherein the first output lags behind the second output;

FIG. 12 illustrates a top view of the welding apparatus of FIG. 9a wherein the third output leads the first output;

FIG. 13 illustrates a flowchart of an embodiment of a method of welding together a plurality of pieces of metal at a joint; and FIG. 14 illustrates a flowchart of an embodiment of a method of welding together an angle joint in a generally horizontal configuration.

DETAILED DESCRIPTION OF THE INVENTION

Apparatuses and methods for welding now will be described more fully hereinafter with reference to the accompanying drawings in which some but not all embodiments are shown. Indeed, the present development may be embodied in many different forms and should not be construed as limited to the embodiments set forth herein; rather, these embodiments are provided so that this disclosure will satisfy applicable legal requirements. Like numbers refer to like elements throughout.

Figure 2C:
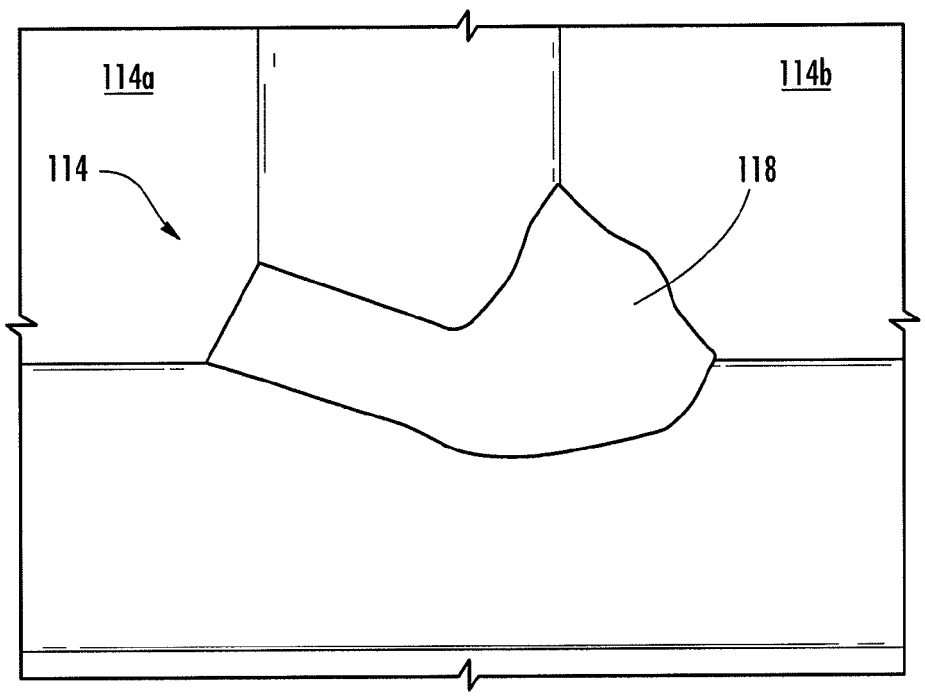

FIG. 2a illustrates a first piece of metal 116a and a second piece of metal 116b which are positioned so as to form a joint 114. FIG. 2b illustrates a corresponding embodiment of a welding apparatus 100 configured to weld together the first 116a and second 116b pieces of metal at the joint 114. The welding apparatus 100 includes a high energy density heat source 110 configured to direct a first output 110' against a first side 114a of the joint. The first output 110' thereby produces a keyhole 122 (which may alternatively be referred to as a channel) surrounded by a first molten metal pool 120a comprising metal from the first piece of metal 116a and/or the second piece of metal 116b. Both the keyhole 122 and the first molten metal pool 120a extend from the first side 114a of the joint 114 generally toward a second side 114b of the joint. The first molten metal pool 120a may comprise vapors and/or liquids produced by heating the first piece of metal 116a and the second piece of metal 116b with the first output 110' from the high energy density heat source 110. Further, a filler material may be added in some embodiments to feed into the first molten metal pool 120a for a larger weld. The apparatus may simultaneously direct a second output 112' from an arc welding heat source 112 against the second side 114b of the joint 114 to produce a second molten metal pool 120b adjacent the second side. Further, the first output 110' from the high energy density heat source 110 is directed such that the keyhole 122 extends to the second molten metal pool 120b, such that it may connect with a lower portion of the second molten metal pool. Thus, the second molten metal pool 120b may be joined with the first molten metal pool 120a by the keyhole 122 to create a common molten metal pool 120 extending substantially across the joint 114. When the common molten metal pool 120 solidifies, as illustrated in FIG. 2c, it may form a weld 118 extending completely through the joint 114 from the first side 114a to the second side 114b of the joint 114.

Thus, issues with forming a weld completely through the joint, as may be experienced using traditional laser hybrid welding, for example laser energy loss as a laser beam passes through an electric arc, may be avoided. In particular, the keyhole may improve the fluid flow in the between the first molten metal pool and the second molten metal pool so that a more stable common molten metal pool is created. Therefore, a thicker weld extending from one side of the joint to the other side may be achieved. Further, the weld extending through the joint may be produced in a single pass without having to provide a high energy density heat source on both sides of the joint as described above in regards to the prior art. Additionally, by providing the first output and the second output on opposite sides of the joint such that the first output is directed so that the keyhole extends to the second molten metal pool, thermomechanical stabilization of the arc produced by the arc welding heat source may occur, which may contribute to the production of a stronger and more precise weld with less weld defects. Accordingly, relatively fast welding speeds may be used. A desired weld profile may be obtained as well by optimizing the welding parameters, including the alignment of the laser beam, joint position, and the arc welding torch.

The high energy density heat source 110 may comprise a variety of different sources of high energy density heat in the form of the first output 110'. For example, the high energy density heat source 110 may comprise a laser which produces a laser beam first output 110'. In an additional embodiment the high energy density heat source 110 may comprise an electron beam gun which produces an electron beam first output 110'. In a further embodiment, the high energy density heat source 110 may comprise a plasma arc torch which produces a transferred plasma arc first output 110'. However, additional embodiments of high energy density heat sources 110 may also be used so long as they can produce the keyhole 122 through the joint 114.

Further, the arc welding heat source 112 may comprise a variety of different sources of heat. For example, the arc welding heat source 112 may comprise a gas metal arc welding (GMAW) torch which produces an arc second output 112'. In particular, the GMAW torch may comprise a metal inert gas (MIG) welding torch or a metal active gas (MAG) welding torch, and metal transfer may involve globular, short-circuiting, spray or pulse-spray, in some embodiments. In other embodiments the arc welding heat source 112 may comprise a gas tungsten arc welding (GTAW) torch, a flux-cored arc welding (FCAW) torch, a submerged arc welding (SAW) torch, or a plasma arc welding (PAW) torch which may operate in transferred or non-transferred modes. However, various other types of welding torches may be used as the arc welding heat source 112. Further, in some embodiments the arc welding heat source 112 may or may not use a shielding gas or wire feeder.

Thus, in summary, the arc welding heat source 112 may comprise many of the known types of welding devices, so long as the welding device is capable of producing the second molten metal pool 120b. In some embodiments the arc welding heat source 112 may comprise a high energy density heat source such as a plasma arc torch, as described above, so long as it produces the second molten metal pool 120b. Therefore, in terms of distinguishing characteristics, the arc welding heat source 112 produces at least the second molten metal pool 120b, whereas the high energy density heat source 110 produces at least the first molten metal pool 120a and the keyhole 122.

In addition to different types of first outputs 110' produced by the above-described high energy density heat sources 110 and different types of second outputs 112' produced by the above-described arc welding heat sources 112, the first output and/or the second output may also be continuous or discontinuous. For example, the first output 110' may be continuous wave, pulsed, defocused, focused, oscillated, split, or elongated depending on the type of high energy density heat source 110 used and the application. Further multiple high energy density heat sources 110 and/or multiple arc welding heat sources 112 may be used in some embodiments.

Figure 3A:
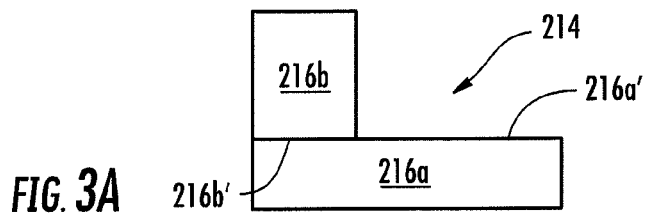
FIG. 3a illustrates a corner joint comprising a first piece of metal and a second piece of metal.
Figure 3B:
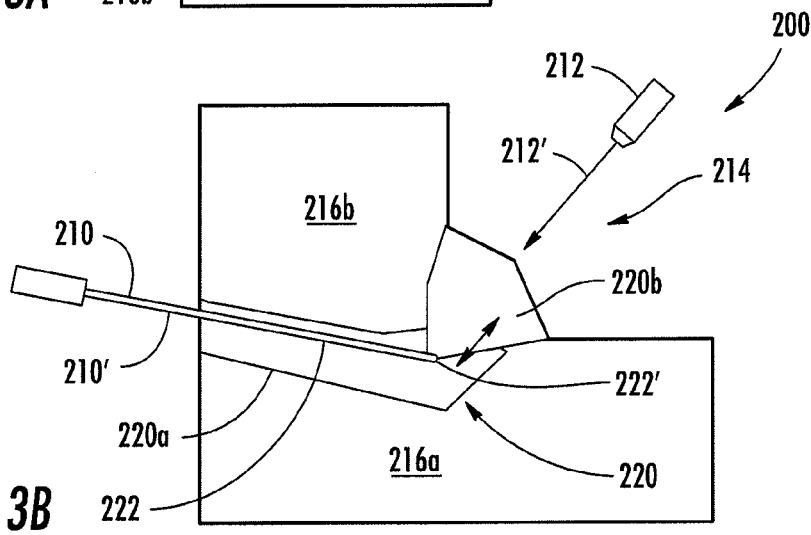
FIG. 3b illustrates a schematic representation of a welding apparatus configured to weld the joint of FIG. 3a comprising a high energy density heat source on a first side of the joint and an arc welding heat source on a second side of the joint.
Figure 4A:
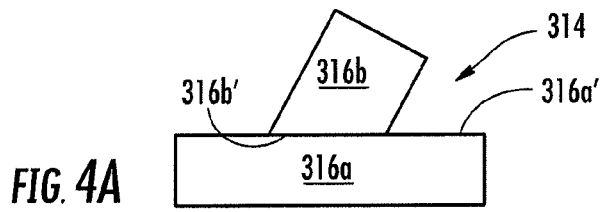
FIG. 4a illustrates a skewed tee-joint comprising a first piece of metal and a second piece of metal, wherein the second piece of metal leans to the right.
Figure 4B:
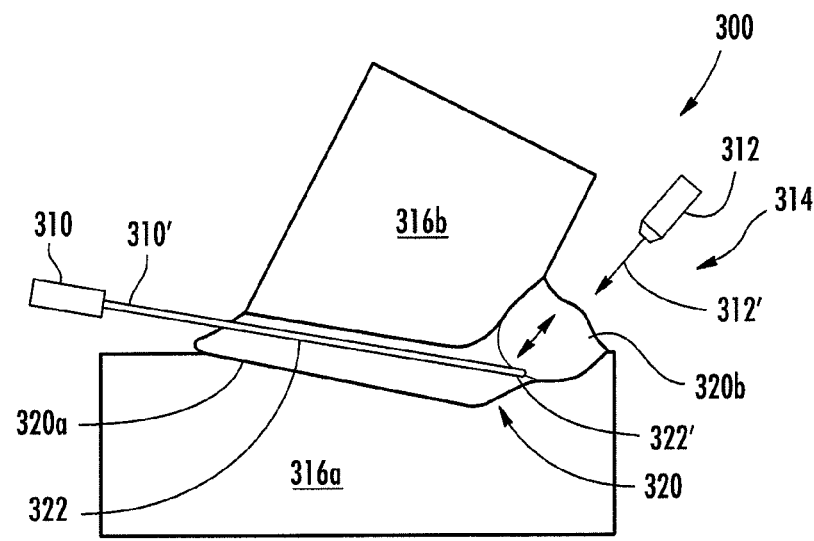
FIG. 4b illustrates a schematic representation of a welding apparatus configured to weld the joint of FIG. 4a comprising a high energy density heat source on a first side of the joint and an arc welding heat source on a second side of the joint.
Figure 5A:
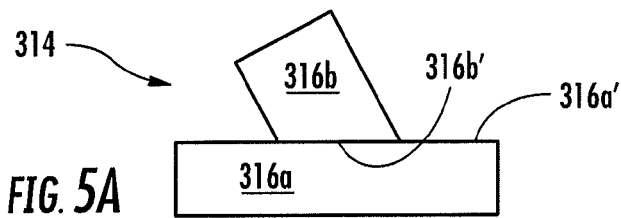
FIG. 5a illustrates a skewed tee-joint comprising a first piece of metal and a second piece of metal, wherein the second piece of metal leans to the left.
Figure 5B:
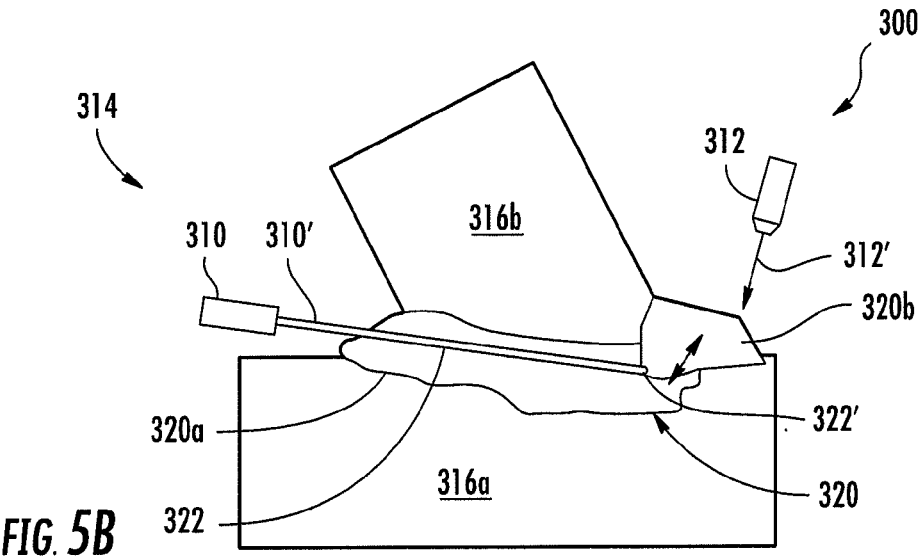
FIG. 5b illustrates a schematic representation of a welding apparatus configured to weld the joint of FIG. 5a comprising a high energy density heat source on a first side of the joint and an arc welding heat source on a second side of the joint.
Figure 6A:
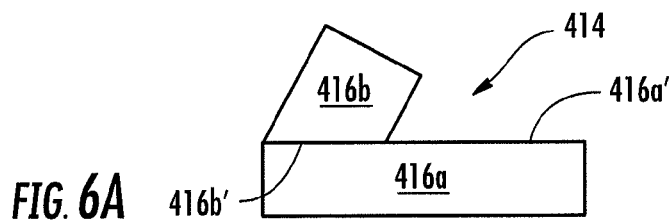
FIG. 6a illustrates a skewed corner joint comprising a first piece of metal and a second piece of metal, wherein the second piece of metal leans to the right.
Figure 6B:
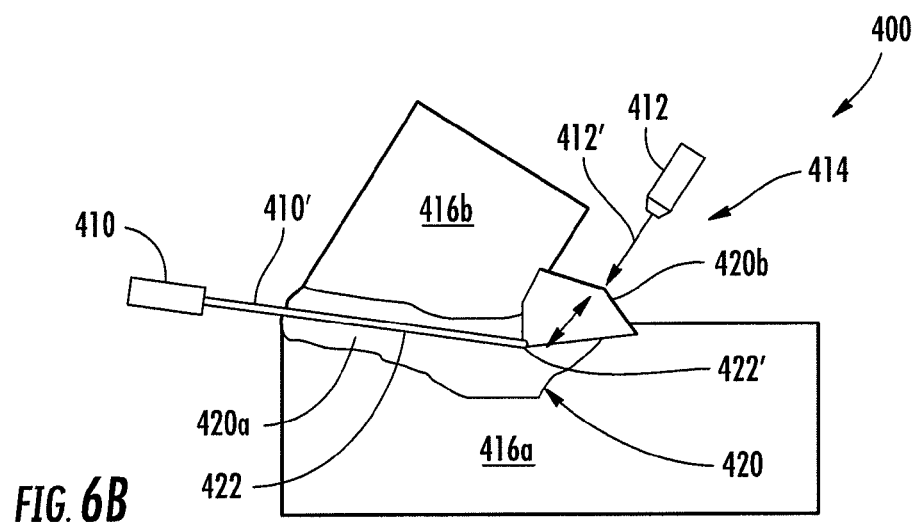
FIG. 6b illustrates a schematic representation of a welding apparatus configured to weld the joint of FIG. 6a comprising a high energy density heat source on a first side of the joint and an arc welding heat source on a second side of the joint.
Figure 7A:
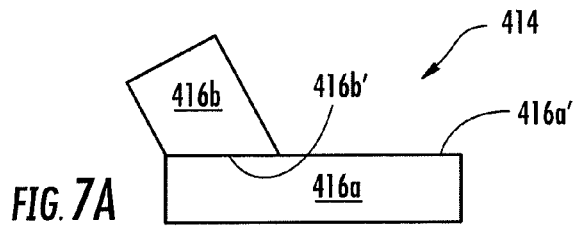
FIG. 7a illustrates a skewed corner joint comprising a first piece of metal and a second piece of metal, wherein the second piece of metal leans to the left.
Figure 7B:
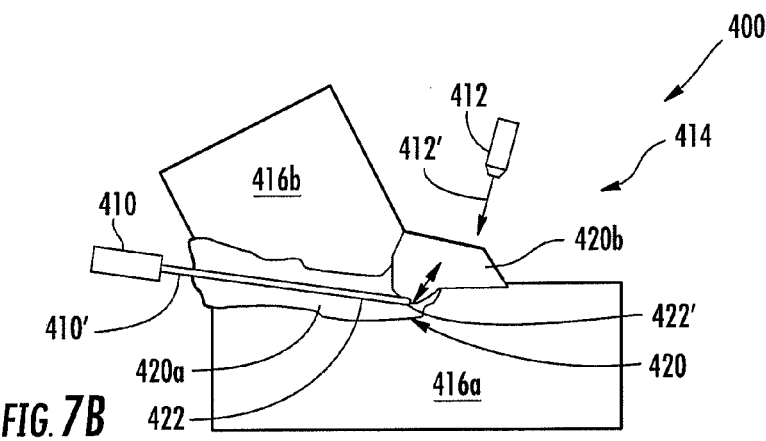
FIG. 7b illustrates a schematic representation of a welding apparatus configured to weld the joint of FIG. 7a comprising a high energy density heat source on a first side of the joint and an arc welding heat source on a second side of the joint.

The joint between the pieces of metal which are welded together may comprise a number of different configurations. In some embodiments the pieces of metal may form an angle joint. Angle joints, as used herein, refer to tee-joints 114 (see FIGS. 2a-c), corner joints 214 (see FIGS. 3a-b), skewed tee-joints 314 (see FIGS. 4a-b and 5a-b), skewed corner joints 414 (see FIGS. 6a-b and 7a-b), and other joints in which two or more pieces of metal join such that they create an angle with respect to one another. When the joints are skewed, they may be skewed in various directions such as to the right as illustrated in FIGS. 4a-b and 6a-b, or to the left as illustrated in FIGS. 5a-b and 7a-b.

When the angle joints 114, 214, 314, 414 are oriented as illustrated in FIGS. 2a, 3a, 4a, 5a, 6a, and 7a, the first piece of metal 116a, 216a, 316a, 416a has a generally horizontal upper surface 116a', 216a', 316a', 416a' and the second piece of metal 116b, 216b, 316b, 416b has a generally horizontal lower surface 116b', 216b', 316b', 416b', wherein at least part of the generally horizontal lower surface of the second piece of metal abuts the upper surface of the first piece of metal to form the angle joint. In such embodiments, as illustrated in FIGS. 2b, 3b, 4b, 5b, 6b, and 7b, the welding apparatus 100, 200, 300, 400 may be oriented such that the first output 110', 210', 310', 410' from the high energy density heat source 110, 210, 310, 410 may be directed such that the keyhole 122, 222, 322, 422 extends to a point 122', 222', 322', 422' just in the lower portion of the second molten metal pool 120b, 220b, 320b, 420b produced by the second output 112', 212', 312', 412' from the arc welding heat source 112, 212, 312, 412. Accordingly, the second molten metal pool 120b, 220b, 320b, 420b may join with the first molten metal pool 120a, 220a, 320a, 420a to form a common molten metal pool 120, 220, 320, 420. However, the embodiments described above are only some examples of welding positions for the joint. For example, various combinations of flat welding positions (known as "1F"), horizontal welding positions (known as "2F"), and overhead welding positions (known as "4F") of the pieces of metal may be used.

In other configurations wherein the joint is oriented differently and in embodiments wherein the joint is not an angle joint, the first output and the second output may still be oriented such that the first output and the second output form a non-zero angle of incidence with respect to one another. Non-zero angle of incidence, as used herein, is not intended to be limited to instances in which the first output and the second output directly intersect, because in some embodiments, as will be described below, the first output and second output may lead or lag one another. Rather this terminology further includes embodiments in which the first output and the second output generally define an angle with respect to one another as viewed through a cross-section through the joint. Configurations in which the first output and the second output form a non-zero angle of incidence may be preferable, as compared to directing the first output directly at the second molten metal pool, in order to avoid blowing out the second molten metal pool with the first output. In particular, the second molten metal pool may provide for a relatively larger and stronger weld, so the first output may be directed such that it does not force the second molten metal pool away from the joint. Thus, in some embodiments, the first output may be directed so that the keyhole extends to a fusion boundary of the second molten metal pool. In some other embodiments, the keyhole may extend to the bottom of the second molten metal pool, or the keyhole may extend to a lower portion of the second molten metal pool, so as to avoid blowing out the second molten pool. The first output may be of such a strength that it substantially only reaches the boundary of the second molten metal pool, without extending completely therethrough.

Figure 8:
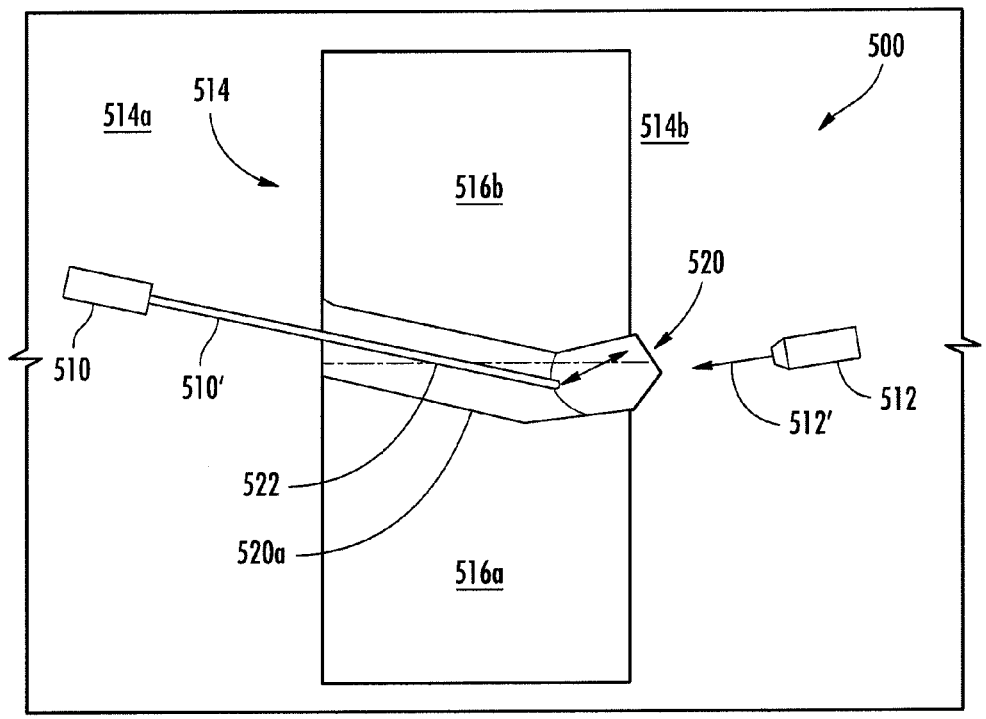
FIG. 8 illustrates a schematic representation of a welding apparatus configured to weld a butt-joint comprising a high energy density heat source on a first side of the joint and an arc welding heat source on a second side of the joint.

Various other types of joints may be welded using embodiments of the invention, such as a butt-joint 514, as illustrated in FIG. 8. In this embodiment, first 516a and second 516b pieces of metal may be welded such that their ends join together to form the butt-joint 514. However, the welding apparatus 500 configured to weld the butt-joint 514 may generally remain the same, with a high energy density heat source 510 directing a first output 510' against a first side 514a of the butt joint 514 to create a keyhole 522 surrounded by a first molten metal pool 520a which extends from the first side of the butt-joint generally toward a second side 514b of the butt-joint. The welding apparatus 500 may simultaneously direct a second output 512' from an arc welding heat source 512 against the second side 514b of the butt-joint 514 to produce a second molten metal pool 520b adjacent the second side of the butt-joint. Accordingly, the first molten metal pool 520a and the second molten metal pool 520b may join to form a common molten metal pool 520 by way of the keyhole 522.

As has been described above, embodiments of the welding apparatus include a high energy density heat source and an arc welding heat source. However, as mentioned above, some embodiments may further comprise a two or more arc welding heat sources. As illustrated in FIG. 9a, in such embodiments the high energy density heat source 910 may direct the first output 910' against a first side 914a of the joint 914 between first 916a and second 916b pieces of metal and the arc welding heat source 912 may direct the second output 912' against a second side 914b of the joint in the same manner as described above with respect to the embodiments of welding apparatuses comprising only a high energy density heat source and an arc welding heat source. However, the welding apparatus 900 illustrated in FIG. 9a further includes a second arc welding heat source 928 which directs a third output 928' against the first side 914a of the joint 914. As with the first output from the high energy density heat source and the second output from the arc welding heat source from the previously-discussed embodiments of welding apparatuses, the third output 928' from the second arc welding heat source 928 may be discontinuous or continuous. Similarly, the second arc welding heat source 928 may comprise various embodiments of arc welding devices such as GTAW, GMAW, FCAW, SAW, or PAW torches as described above with respect to the arc welding heat source.

Figure 9B:
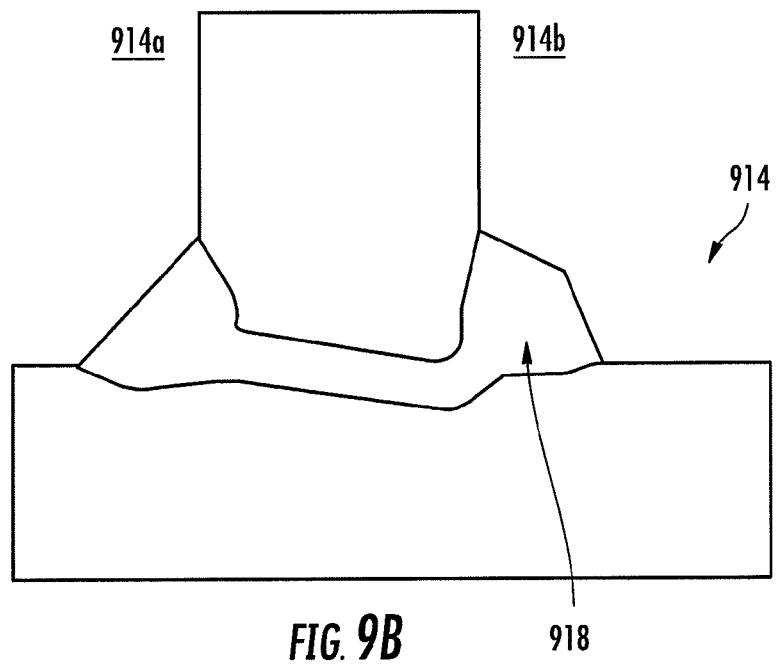
FIG. 9b illustrates a welded joint which may result from operating the welding apparatus from FIG. 9a on the joint.

The third output 928' may form a third molten metal pool 920c which may combine with the first molten metal pool 920a and the second molten metal pool 920b to form a common molten metal pool 920. The common molten metal pool 920 may thereby solidify to form a weld 918, as illustrated in FIG. 9b, that may comprise more material on the first side 914a of the joint 914 as compared to the weld 118 produced by the welding apparatus 100 without the second arc welding heat source (see, e.g., FIG. 2c). Thus, the welding apparatus 900 illustrated in FIG. 9a may be preferable in applications wherein a more symmetrical weld across the width of the joint 914 from the first side 914a to the second side 914b is desirable, such as for strength or aesthetic purposes. Further, the first output 910' may stabilize the third output 928' and the third molten metal pool 920c and a manner similar to the way in which it stabilizes the second output 912' and the second molten metal pool 920b.

Embodiments of the welding apparatus may also weld joints wherein the surfaces of the pieces of metal that are in proximity at the joint at least partially form an angle with one another. In some embodiments a first joint surface on a first one of the pieces of metal and a second joint surface on a second one of the pieces of metal define an angle with respect to one another such that there is a gap therebetween. Examples of such embodiments are illustrated in FIGS. 10a-c.

FIG. 10a illustrates an embodiment of a welding apparatus 600 configured to weld a joint 614. The joint 614 comprises a first piece of metal 616a and a second piece of metal 616b. The first piece of metal 616a comprises a first joint surface 616a' and the second piece of metal 616b comprises a second joint surface 616b' and a third joint surface 616b". As illustrated, the first piece of metal 616a and the second piece of metal 616b may be aligned such that the first joint surface 616a' and the second joint surface 616b' define an angle with respect to one another such that there is a gap 624 therebetween. The high energy density heat source 610 may be aimed such that the first output 610' is directed through the gap 624, and the second output 612 may be aimed at the opposite side of the joint 614, as previously described. Aiming the first output 610' through the gap 624 may be desirable in some embodiments because the high energy density heat source 610 may require less power. In some embodiments the welding apparatus 600 may further comprise a third output 928' from a second arc welding heat source 928 in order to assist in filling the gap 624 completely with a common molten pool. In such embodiments the first output 610' from a high energy density heat source may lead or lag the third output 928' slightly to reduce the power level required for operation of the high energy density heat source.

As illustrated in FIG. 10a, the third joint surface 616b" on the second piece of metal 616b may be configured such that it is generally parallel with the first joint surface 616a' on the first piece of metal 616a. However, not all embodiments of joints wherein the surfaces forming the joint at least partially form an angle with one another have this feature. For example, FIG. 10b illustrates an embodiment of a joint 714 wherein the second piece of metal 716b does not comprise a third joint surface. Rather, the gap 724 is formed between a first joint surface 716a' on the first piece of metal 716a and a second joint surface 716b' on the second piece of metal 716b. In an alternate embodiment, as illustrated in FIG. 10c, the joint 814 may define more than one gap. For example, the embodiment in FIG. 10c defines a gap 824 between a first joint surface 816a' on a first piece of metal 816a and a second joint surface 816b' on a second piece of metal 816b and further a second gap 826 defined between the first joint surface and a third joint surface 816b" on the second piece of metal. The second gap 826 may thus generally be located on the opposite side of the second piece of metal 816b from the gap 824. Two gaps, 824 and 826, may have a same profile in some embodiment. However, they may have different profiles in some other embodiments. In this embodiment the arc welding heat source may direct the second output towards the second gap such that the second molten metal pool is received therein. Receiving the second molten metal pool in the second gap may provide benefits in terms of aesthetics and also the second gap may function to hold the second molten metal pool in place and may reduce the required power level of the first output as well because the keyhole generated from the first output has a shorter distance to penetrate.

In some embodiments the angle forming each gap may be defined by a chamfer on the first or second piece of metal. The chamfers may be created by a variety of manufacturing techniques such as sheared edge, laser cut edge, single bevel edge, plasma cut edge, or double bevel edge. In other embodiments, the angle defining the gap may be created by tilting a square edged piece of metal against the other piece of metal. In such embodiments the first piece of metal and the second piece of metal will not be perfectly perpendicular to one another.

Further, while the angle was generally described above as being formed by the second piece of metal, in alternate embodiments the first piece of metal may define the angle, such as when the first piece of metal comprises a chamfer. In other embodiments both the first piece of metal and the second piece of metal may comprise features which define the angle. For example, both the first piece of metal and the second piece of metal may comprise respective chamfers.

Additionally, while the joint surfaces shown and described above were generally described as comprising flat surfaces, in alternate embodiments the joint surfaces may be curved surfaces. Additionally or alternatively, each joint surface may comprise multiple segments such that the gap is defined by multiple angles. Regardless of the particular features comprising the angle(s) and corresponding gap, each of the above-described embodiments are intended to be included within the meaning of generally horizontal, as previously described, depending on the orientation of the joint. Thus, for example, although the second joint surface 816b' and the third surface 816b" of the joint 814 illustrated in FIG. 10c are not perfectly horizontal, this configuration is intended to be included within the meaning of generally horizontal as described above.

As described above, the first output and the second output may be simultaneously directed against the joint. Simultaneously herein refers to a variety of configurations wherein the first output and the second output are directed at the joint at the same time, but not necessarily at the same section of the joint in the welding direction at the same time. For instance, FIG. 11a illustrates a top view of the welding apparatus 100 of FIG. 2b which is configured to weld the joint 114 along a machine direction 130. Welding in the machine direction 130 may involve either or both of moving the welding apparatus 100 or the pieces of metal 116a, b. As illustrated, the first output 110' from the high energy density heat source 110 and the second output 112' from the arc welding heat source 112 may be directed such that they generally align in the machine direction 130 such that first output and the second output are generally directed at the same section of the joint 114 at the same time. Therefore, the keyhole 122 is generally directed toward the center of the second molten metal pool 120b as viewed from above.

However, FIG. 11b illustrates an embodiment of the welding apparatus 100 from FIG. 2b in which the first output 110' leads the second output 112' in the machine direction 130. Conversely, FIG. 11c illustrates an embodiment of the welding apparatus 100 from FIG. 2b in which the first output 110' lags behind the second output 112' in the machine direction 130. In other embodiments the first output 110' may initially lag behind the second output 112', but then the second output may lead the first output later in the weld, or the opposite may occur. This could be the case, for example, when the high energy density heat source 110 travels along the joint 114 at a faster speed than the arc welding heat source 112, or vice versa. Thus, various configurations making use of the welding apparatus 100 to simultaneously direct first 110' and second 112' outputs at the joint 114 are possible. Note that in all three of the illustrated embodiments in FIGS. 11a-c, the first output 110' creates the keyhole 122 at a position which overlaps along the machine direction with the second molten metal pool 120b as created by the second output 112' such that the second molten metal pool may join with the first molten metal pool 120a to form the common molten metal pool 120.

With regard to the welding apparatus 900 illustrated in FIG. 10a, various configurations are possible wherein the first output 910', second output 912', and third output 928' are directed at the joint 914 simultaneously, similarly as to the welding apparatus 100 described above. Thus, in various combinations, the first output 910' may lead or lag the second output 912', the third output 928' may lead or lag the second output, and the third output may lead or lag the first output along a machine direction 930 of welding the joint. For example, an overhead view of the welding apparatus 900 is illustrated in FIG. 12. In this embodiment the first output 910' lags behind the third output 928'. This embodiment may allow the first output 910' from the high energy density heat source 910 to push the third molten metal pool 920c as provided by the second arc welding heat source 912 into the keyhole 922. By pushing the third molten metal pool 920c into the keyhole 922, this may facilitate joining the third molten metal pool with the first molten metal pool 920a and the second molten metal pool 920b to form the common molten metal pool 920. Accordingly, creation of a strong weld may be encouraged.

The above description generally focused on embodiments of apparatuses. However, embodiments of associated methods are also provided. FIG. 13 illustrates one embodiment of a method of welding together a plurality of pieces of metal at a joint between the pieces of metal. The method comprises directing a first output from a high energy density heat source against a first side of the joint at operation 1102. The high energy density heat source may in some embodiments comprise a laser, electron beam gun, or PAW torch in some embodiments, as indicated at block 1104. The first output thereby produces a keyhole surrounded by a first molten metal pool which extends from the first side generally toward a second side of the joint as indicated at block 1106.

While directing the first output at operation 1102, the method further comprises simultaneously directing a second output from an arc welding heat source against the second side of the joint at operation 1108. The arc welding heat source may in some embodiments comprise a GTAW, GMAW, FCAW, SAW, or PAW torch in some embodiments, as indicated at block 1110. As indicated at block 1112, the second output thereby produces a second molten metal pool adjacent the second side. Further, the first output is directed such that the keyhole extends to the second molten metal pool at block 1114. Thereby, at block 1116 the second molten metal pool is joined with the first molten metal pool by the keyhole. Thus, the method creates a common molten metal pool which solidifies to form a weld extending through the joint from the first side to the second side at block 1118.

In some embodiments of the method the joint may comprise an angle joint, as indicated at block 1120. Additionally in some embodiments a first joint surface on a first one of the pieces of metal and a second joint surface on a second one of the pieces of metal may define an angle with respect to one another such that there is a gap therebetween, as indicated at block 1122. As shown at block 1124, the angle may be defined by a chamfer on one of the pieces of metal. Further, as indicated at block 1126, the first output may be directed through the gap. In some embodiments the common molten metal pool may at least partially fill the gap, as indicated at block 1128. Also, in some embodiments the method may comprise the operation 1130 of directing the first output and the second output such that the first output and the second output form a non-zero angle of incidence with respect to one another or the first output may be directed at a lower portion of the second molten metal pool to avoid blowing out the second molten metal pool as described above.

In additional embodiments the method may further comprise the operation 1132 of directing a third output from a second arc welding heat source against the first side of the joint, which produces a third molten metal pool, as indicated at block 1134. As shown at block 1136, the third molten metal pool may thereby join with at least the first molten metal pool to form the common molten metal pool. Further, in some embodiments the first output lags behind or leads the third output, as indicated at block 1138. When the first output lags behind the third output, it may push the third molten metal pool into the keyhole. As with the arc welding heat source, the second arc welding heat source may comprise a GTAW, GMAW, FCAW, SAW, or PAW torch. Further, as indicated at block 1140, the first output, the second output, and/or the third output may be discontinuous.

Additionally, FIG. 14 illustrates one embodiment of a method of welding an angle joint between a first piece of metal and a second piece of metal, wherein the first piece of metal has a generally horizontal upper surface and the second piece of metal has a generally horizontal lower surface, and wherein at least part of the first piece of the generally horizontal lower surface of the second piece of metal abuts the upper surface of the first piece of metal to form the angle joint. An angle joint, as described above, may comprise tee-joints, corner joints, skewed tee-joints, skewed corner joints, and other joints in which two pieces of metal join to such that they create an angle with respect to one another. The two pieces may or may not have a small gap in between in some cases. The method comprises directing a first output from a high energy density heat source against a first side of the angle joint at operation 1202. The first output thereby produces a first molten metal pool in a keyhole extending from the first side generally toward a second side of the angle joint as indicated at block 1206.

While directing the first output at operation 1202, the method further comprises simultaneously directing a second output from an arc welding heat source against the second side of the angle joint at operation 1208. As indicated at block 1212, the second output thereby produces a second molten metal pool adjacent the second side of the angle joint. Further, the first output may be directed such that the keyhole extends to a point just in the lower portion of the second molten metal pool as indicated at block 1214. This may avoid blowing out the second molten metal pool, such as may occur when the first output is directed at the center or upper portion of the second molten metal pool, while still allowing for fluid communication between the second molten metal pool and the first molten metal pool. Thereby, at block 1216 the second molten metal pool is joined with the first molten metal pool by the keyhole. Thus, this creates a common molten metal pool which solidifies to form a weld extending through the angle joint from the first side to the second side as indicated at block 1218. Accordingly, methods particularly relating to welding angle joints are also provided.

Many modifications and other embodiments will come to mind to one skilled in the art to which these embodiments pertain having the benefit of the teachings presented in the foregoing descriptions and the associated drawings. Therefore, it is to be understood that modifications and other embodiments are intended to be included within the scope of the appended claims. Although specific terms are employed herein, they are used in a generic and descriptive sense only and not for purposes of limitation.

That which is claimed:

1. A method of welding together a plurality of pieces of metal at a joint between the pieces of metal, comprising:
    directing a laser beam from a laser against a first side of the joint to produce a keyhole surrounded by a laser-created molten metal pool which extends from the first side of the joint toward a second side of the joint;
    simultaneously directing a first arc from a first arc welder against the first side of the joint to produce a first arc-created molten metal pool that joins with the laser-created molten metal pool to form a joined first-side molten metal pool; and
    simultaneously directing a second arc from a second arc welder against the second side of the joint to produce a second arc-created molten metal pool adjacent the second side of the joint,
    wherein the laser beam is directed such that the keyhole extends to the second arc-created molten metal pool,
    whereby the second arc-created molten metal pool is joined by the keyhole with the joined first-side molten metal pool to create a common molten metal pool which solidifies to form a weld extending through the joint from the first side to the second side,
    and wherein a the common molten metal pool provides stabilization to both the first arc and the second arc.

2. The method of claim 1, wherein the stabilization includes at least thermomechanical weld pool stabilization.

3. The method of claim 1, further comprising directing the laser beam and the first arc such that the laser beam and the first arc form a non-zero angle of incidence with respect to one another.

4. The method of claim 1, wherein a first joint surface on a first one of the pieces of metal and a second joint surface on a second one of the pieces of metal define an angle with respect to one another such that there is a gap therebetween.

5. The method of claim 1, wherein the laser beam lags behind the second arc.

6. The method of claim 1, wherein the laser beam leads the second arc.

7. The method of claim 1, wherein at least one of the laser beam, the first arc, and the second arc is discontinuous.

8. The method of claim 1, wherein the first arc welder comprises a gas tungsten arc welding torch.

9. The method of claim 1, wherein the first arc welder comprises a gas metal arc welding torch.

10. The method of claim 1, wherein the first arc welder comprises a flux-cored arc welding torch.

11. The method of claim 1, wherein the first arc welder comprises a plasma arc welding torch.

12. The method of claim 1, wherein the first arc welder comprises a submerged arc welding torch.

13. The method of claim 4, wherein the angle is defined by a chamfer on one of the pieces of metal.

14. The method of claim 4, wherein the laser beam is directed through the gap.

15. The method of claim 4, wherein the common molten metal pool at least partially fills the gap.

16. A welding apparatus configured to weld together a plurality of pieces of metal at a joint between the pieces of metal, comprising:
   a laser configured to direct a laser beam against a first side of the joint to produce a keyhole surrounded by a laser-created molten metal pool which extends from the first side of the joint toward a second side of the joint;
   a first arc welder configured to simultaneously direct a first arc against the first side of the joint to produce a first arc-created molten metal pool that joins with the laser-created molten metal pool to form a joined first-side molten metal pool; and
   a second arc welder configured to simultaneously direct a second arc against the second side of the joint to produce a second arc-created molten metal pool adjacent the second side, wherein the laser beam is directed such that the keyhole extends to the second arc-created molten metal pool,
   whereby the second arc-created molten metal pool is joined by the keyhole with the joined first-side molten metal pool to create a common molten metal pool which solidifies to form a weld extending through the joint from the first side to the second side,
   and wherein the common molten metal pool provides stabilization to both the first arc and the second arc.

17. The welding apparatus of claim 16, wherein the laser and the second arc welder are arranged such that the laser beam lags behind the second arc.

18. The welding apparatus of claim 16, wherein the laser and the second arc welder are arranged such that the laser beam leads the second arc.

* * * * *